United States Patent [19]

Fujimoto

[11] Patent Number: 5,698,064
[45] Date of Patent: Dec. 16, 1997

[54] APPARATUS FOR MANUFACTURING RECAPPED TIRE

[75] Inventor: Mikio Fujimoto, Higashimurayama, Japan

[73] Assignee: Bridgestone Corporation, Tokyo, Japan

[21] Appl. No.: 758,265

[22] Filed: Dec. 5, 1996

Related U.S. Application Data

[63] Continuation of Ser. No. 563,484, Nov. 28, 1995, abandoned.

[30] Foreign Application Priority Data

Dec. 5, 1994 [JP] Japan ................................ 6-300843

[51] Int. Cl.$^6$ .................................................... B29D 30/54
[52] U.S. Cl. ......................... 156/394.1; 156/96; 156/909; 425/17; 425/58
[58] Field of Search ........................ 156/96, 394.1, 156/909, 382, 128.1; 425/17, 22, 28.1, 36, 58, 24, 14

[56] References Cited

U.S. PATENT DOCUMENTS

| 3,127,297 | 3/1964 | Kent . | |
| 3,730,801 | 5/1973 | Martin . | |
| 3,883,382 | 5/1975 | Pelletier | 425/17 |
| 3,886,028 | 5/1975 | Hindin et al. | 156/96 |
| 4,111,732 | 9/1978 | MacMillan | 156/909 |
| 4,600,467 | 7/1986 | Perdue | 156/909 |
| 4,966,640 | 10/1990 | Hill | 156/909 |

FOREIGN PATENT DOCUMENTS

| 0 286 612 | 10/1988 | European Pat. Off. . | |
| 356553 | 3/1990 | European Pat. Off. | 425/17 |
| 381632 | 8/1990 | European Pat. Off. | 425/17 |
| 2 377 879 | 8/1978 | France . | |
| 42 29 125 | 3/1994 | Germany . | |
| 2 032 858 | 5/1980 | United Kingdom . | |

Primary Examiner—Geoffrey L. Knable
Attorney, Agent, or Firm—Oliff & Berridge

[57] ABSTRACT

An apparatus for manufacturing a recapped tire includes: a vulcanizer in which is filled a fluid for vulcanization for adhering by vulcanization a base tire and a tread; a rim to which the base tire is mounted; an envelope which is annular and covers an outer periphery of the base tire; suction means for sucking air from between the base tire and the envelope; a tube which is annular and expandable and contractible, the tube being provided at a portion of the rim corresponding to an outer side of the base tire along a tire axial direction, and pushing the envelope against a bead portion of the base tire; a stopper provided at a portion of the rim corresponding to an inner side of the base tire along the tire axial direction, and preventing movement of the bead portion toward the inner side of the base tire along the tire axial direction; and internal pressure providing means for providing internal pressure to the tube so as to inflate the tube. Accordingly, adhesion by vulcanization of the tread can be effected in a short time without shortcomings in manufacturing.

20 Claims, 7 Drawing Sheets

APPARATUS FOR MANUFACTURING RECAPPED TIRE

This is a Continuation of application Ser. No. 08/563,484 filed Nov. 28, 1995, now abandoned.

BACKGROUND OF THE INVENTION

1. Field of the Invention

The present invention relates to an apparatus for manufacturing a recapped tire, and in particular, to an apparatus for manufacturing a recapped tire for adhering by vulcanization a vulcanized tread to a base tire.

2. Description of the Prior Art

A method of vulcanizing a tire called a "pre-cure method" is known as a method of manufacturing a recapped tire.

As illustrated in FIG. 6, in the pre-cure method, an unvulcanized sheet rubber 102 is adhered to the crown portion of a base tire 100. A vulcanized tread 104 is adhered on the sheet rubber 102. The structure is placed in a vulcanizer 106, and is vulcanized for a predetermined period of time.

Hereinafter, conventional manufacturing of a recapped tire will be described on the basis of FIG. 6.

The base tire 100 within the vulcanizer 106 is mounted to a rim 108, and the exterior portion thereof is covered by an envelope 110. The end portions of the envelope 110 are nipped and fixed between the rims 108 and bead portions 112 of the base tire 100. A tube 114 is disposed at the interior portion of the base tire 100.

During vulcanization, first, air (e.g., 8.0 kg/cm² pressure) is filled in the tube 114 within the base tire 100, and the air in the space between the envelope 110 and the base tire 100 is sucked and removed. Next, steam or hot air (e.g., 6.2 kg/cm² pressure) is filled in the interior of the vulcanizer 106.

In this way, the base tire 100 and the tread 104 are sandwiched between the inflated tube 114 and the envelope 110, and pressure and heat are applied so that the sheet rubber 102 is vulcanized.

However, in the apparatus for manufacturing a recapped tire illustrated in FIG. 6, because air which has not been heated is filled in the tube 114 disposed within the base tire 100, a long time is required to heat the sheet rubber 102 (e.g., 4 to 5 hours). A drawback arises in that production efficiency is low.

In order to overcome the aforementioned drawback, an apparatus for manufacturing a recapped tire which manufactures a recapped tire without using a tube has been proposed. In such an apparatus for manufacturing a recapped tire, in order to nip the end portion of the envelope 110 between the rim 108 and the bead portion 112 of the base tire 100, a structure has been proposed as shown in FIG. 7 in which the rim 108 is expandable and contractible, and a structure has been proposed as shown in FIG. 8 in which a flange portion 108A of the rim 108 is pushed against the envelope 110 by six fastening hardwares (unillustrated) provided on the periphery of the rim 108. However, these structures have the following drawbacks.

In the structure illustrated in FIG. 7 in which the rim 108 is expandable and contractible, even if the base tires are the same size, the configurations thereof respectively differ due to conditions of use such as their running histories or the like. (For example, the outer diameters of the base tires may vary widely due to the growth of the bead portions due to differences in loads, or the outer diameters of the base tires may respectively differ due to wear or the like.) Therefore, when the envelope is pushed against the surface of the bead portion, the distribution of pressure differs at each portion in the peripheral direction. In particular, if there are regions where the pressure is low, the steam or hot air in the vulcanizer penetrates from these regions into the space between the envelope and the tire, and there may be shortcomings in manufacturing such as unsatisfactory adhesion of the tread or the like. Further, in order to provide the structure in which the rim 108 is expandable and contractible, the structure of the rim 108 is extremely complicated and the manufacturing costs are high.

In the structure illustrated in FIG. 8, no drawbacks arise at the regions fastened by the fastening hardwares. However, the fastening force at the portions at which there are no fastening hardwares is insufficient. As a result, the steam or hot air within the vulcanizer penetrates from the portions at which the fastening force is insufficient into the space between the envelope and the tire, and there are shortcomings in manufacturing in the same way as the case described above.

Both of the above-described structures are not preferable from the standpoint of manufacturing as the fastening of the envelope is not uniform in the peripheral direction of the tire.

SUMMARY OF THE INVENTION

In view of the aforementioned, an object of the present invention is to provide an apparatus for manufacturing a recapped tire in which a tread can be adhered by vulcanization in a short time without there being shortcomings in manufacturing.

In accordance with an aspect of the present invention, there is provided an apparatus for manufacturing a recapped tire comprising an apparatus for manufacturing a recapped tire, comprising: a vulcanizer in which is filled a fluid for vulcanization for adhering by vulcanization a base tire and a tread; a rim to which the base tire is mounted; an envelope which is annular and covers an outer periphery of the base tire; suction means for sucking air from between the base tire and the envelope; a tube which is annular and expandable and contractible, the tube being provided at a portion of the rim corresponding to an outer side of the base tire along a tire axial direction, and pushing the envelope against a bead portion of the base tire; a stopper provided at a portion of the rim corresponding to an inner side of the base tire along the tire axial direction, and preventing movement of the bead portion toward the inner side of the base tire along the tire axial direction; and internal pressure providing means for providing internal pressure to the tube so as to inflate the tube.

The following operation is carried out with the apparatus for manufacturing a recapped tire.

When a recapped tire is manufactured by using the apparatus for manufacturing a recapped tire of the present invention, first, an unvulcanized sheet rubber is adhered to a predetermined position of the crown portion of a base tire. A vulcanized tread is adhered on the sheet rubber. Next, an envelope is covered on from above the tread, and the end portion of the envelope is disposed at a predetermined position of the outer side of the bead portion of the base tire.

Next, internal pressure is provided to the tube so as to inflate the tube. Accordingly, the end portion of the envelope is nipped by the inflated tube and by the bead portion for which movement toward the inner side of the base tire in the tire axial direction is prevented by the stopper. The space between the base tire and the end portion of the envelope is sealed. Subsequently, the air in the space between the base tire and the envelope is sucked by the suction means and is made a vacuum.

In this state, when the fluid for vulcanization (e.g., steam, hot air or the like of a predetermined temperature and a predetermined pressure) is filled into the vulcanizer, because the space between the base tire and the envelope is a vacuum and because the pressure within the vulcanizer increases, the envelope is pushed toward the base tire and fit tightly to the tread. The tread is pushed against the crown portion of the base tire, and the sheet rubber is heated from the inside and the outside of the base tire. In this state, after a predetermined period of time elapses, the tread is adhered by vulcanization to the crown portion of the base tire.

Because the sheet rubber for adhering can be heated from the inside and the outside of the base tire by the fluid for vulcanization, the sheet rubber can be vulcanized in a short time.

Further, even if the configuration of the bead portion varies somewhat, because the inflated tube conforms to the outer shape of the bead portion, the envelope can be reliably pressed against the bead portion, and the space between the end portion of the envelope and the bead portion of the base tire can be sealed reliably.

BRIEF DESCRIPTION OF THE DRAWINGS

FIGS. 5A through 5D are partial expanded views of the rim and the stopper plate for explaining an order of sliding of the stopper plate attached to the rim, wherein FIG. 5A is a partial expanded view of the rim and the stopper plate illustrating a state in which the stopper plate is set near a radial direction inner side of the rim; FIG. 5B is a partial expanded view of the rim and time stopper plate illustrating a state in which the stopper plate has been slid in a peripheral direction of the rim; FIG. 5C is a partial expanded view of the rim and the stopper plate illustrating a state in which the stopper plate has been slid toward a radial direction outer side of the rim; and FIG. 5D is a partial expanded view of the rim and the stopper plate illustrating a state in which the stopper plate has been slid in the peripheral direction of the rim such that screw portions are positioned at end portions of U-shaped holes.

DETAILED DESCRIPTION OF THE PREFERRED EMBODIMENT

An embodiment of the present invention will be described in accordance with FIGS. 1 through 5.

Figure 1:
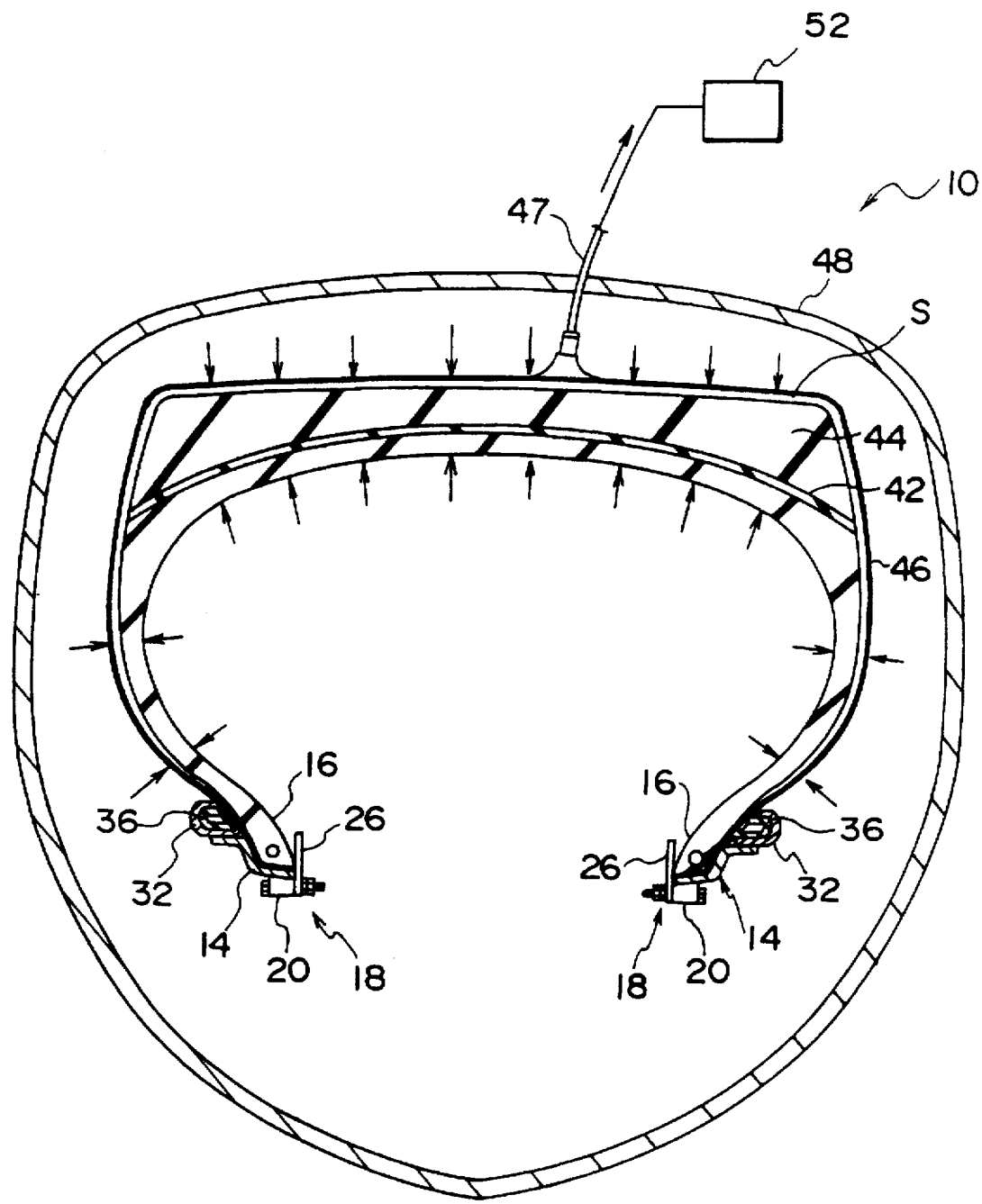
FIG. 1 is a sectional view of an apparatus for manufacturing a recapped tire relating to an embodiment of the present invention.

As illustrated in FIG. 1, in an apparatus 10 for manufacturing a recapped tire of the present embodiment, a pair of rims 14, which are respectively formed annularly and which are used for mounting an annular base tire 12, are provided within a vulcanizer 48 which is annular and formed of metal. The size of the base tire 12 of the present embodiment is, for example, TB11R225, and the size of the rim 14 is, for example, 22.5×7.50.

Figure 2:
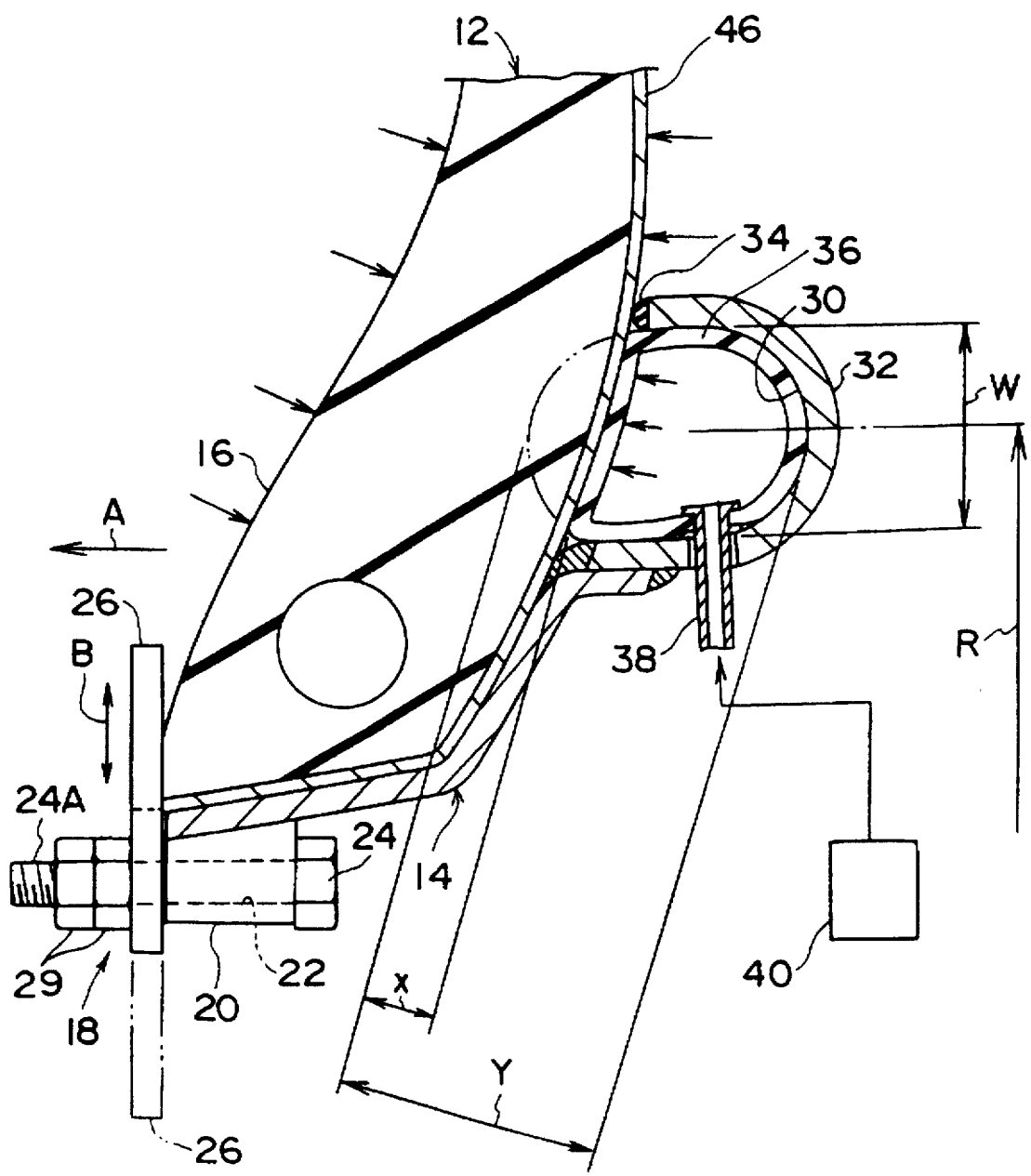
FIG. 2 is an enlarged sectional view of a periphery of a rim.

As shown in FIG. 2, a plurality of fixing devices 18, which are provided so that a bead portion 16 of the base tire 12 does not shift toward the inner side of the base tire 12 along the axial direction of the tire (i.e., the side in the direction of arrow A in FIG. 2), are mounted to the inner peripheral portion of the rim 14 along the peripheral direction. (In the present embodiment, there are twelve fixing devices 18 at each rim 14, so that there are a total of twenty-four fixing devices 18 at both rims 14.)

The fixing device 18 is equipped with a main body block 20 which is fixed by welding to the inner peripheral surface of the rim 14. A through-hole 22 is formed in the main body block 20 along the axial direction of the rim 14. A bolt 24 (in the present embodiment, an M6 size bolt) is inserted into the through-hole 22 from the outer side of the base tire 12 along the axial direction of the tire.

As shown in FIG. 2, a stopper plate 26 is provided at a position of the inner side of the base tire 12 along the tire axial direction with respect to the main body block 20, between the main body block 20 and a pair of nuts 29 which screw with a screw portion 24A, such that a slight gap is provided between the stopper plate 26 and the main body block 20 and a slight gap is provided between the stopper plate 26 and the nuts 29.

Figure 3:
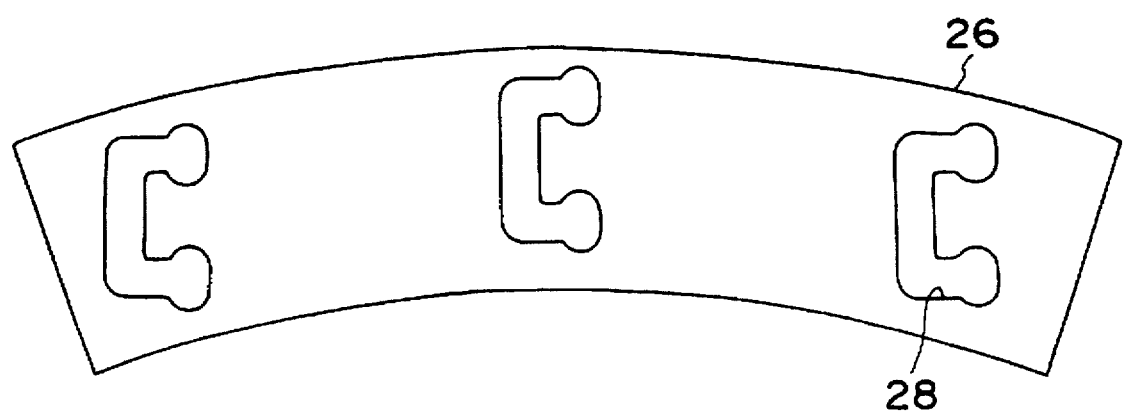
FIG. 3 is a plan view of a stopper plate.

As illustrated in FIG. 3, three U-shaped holes 28 are formed in the substantially fan-shaped stopper plate 26. The screw portions 24A of the bolts 24 are inserted into the respective U-shaped holes 28. The stopper plate 26 is disposed between the pair of nuts 29 and the main body block 20.

Figure 4A:
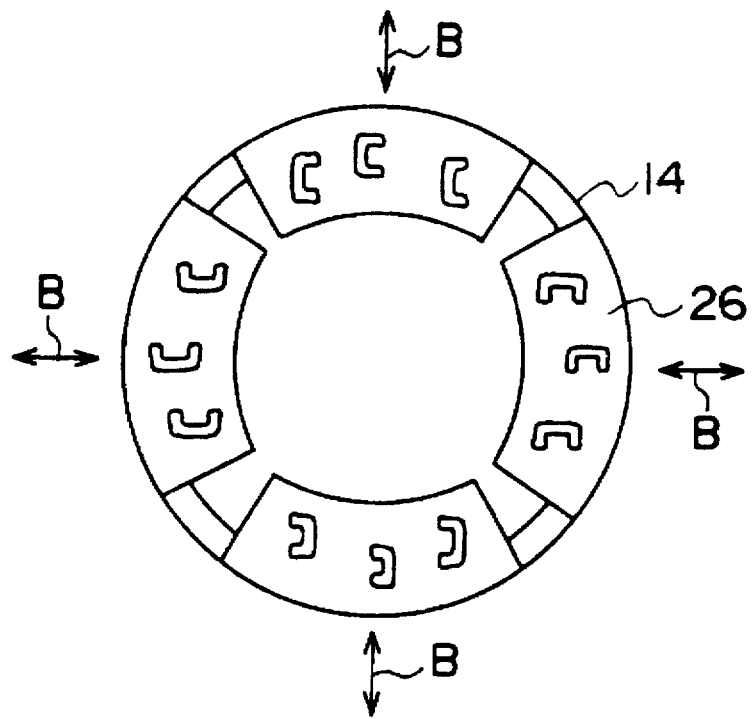
FIG. 4A is a side view in which a rim is viewed from an inner side and which illustrates a state in which the stopper plates are set near an inner side of the rim.
Figure 4B:
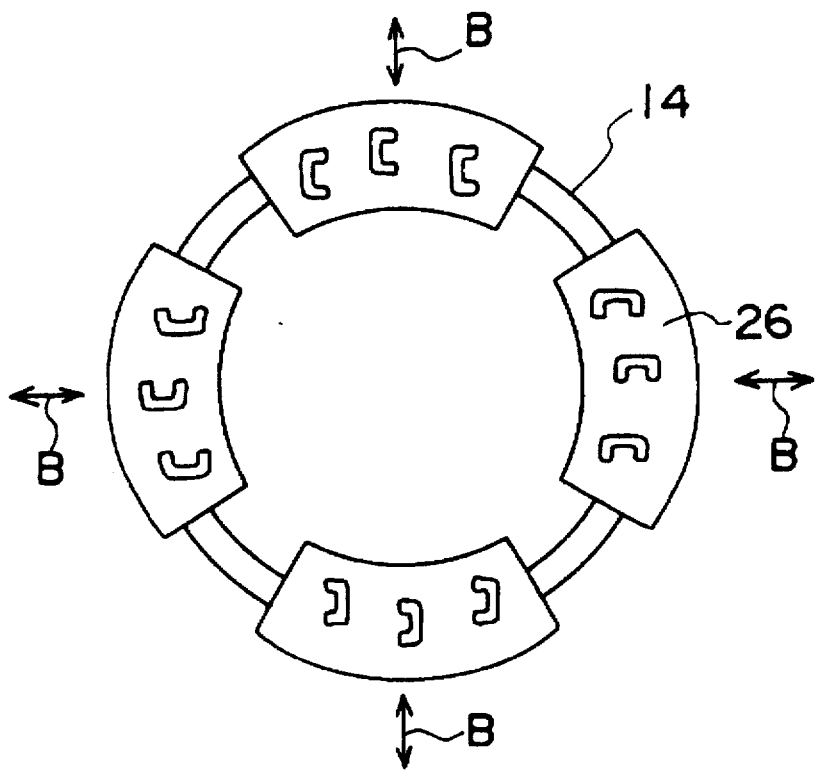
FIG. 4B is a side view in which the rim is viewed from the inner side and which illustrates a state in which the stopper plates are set near an outer side of the rim.

Therefore, as shown in FIGS. 2, 4A, 4B, and 5A through 5D, the stopper plate 26 can slide in the radial direction of the rim 14 (the directions of arrows B). In the present embodiment, as shown in FIGS. 4A and 4B, four stopper plates 26 are disposed on one rim 14.

As illustrated in FIG. 2, a tube case portion 32 is provided at the axial direction outer side end portion of the rim 14 (at the portion corresponding to the rim flange of an ordinary rim). A concave portion 30 having a substantially circular-arc-shaped cross-section is formed in the inner side of the tube case portion 32. The tube case portion 32 in the present embodiment is formed by press working a 6-mm thick steel plate, and is fixed to the rim 14 by welding.

The width W of the concave portion 30 is about 20 to 25 mm. The radius R, which is the distance from the center of the rim 14 to the central portion of the concave portion 30, is about 630 mm. Further, an elastic body 34 for cushioning is adhered to the end portion of the tube case portion 32.

A tube 36, which is annular and expandable and contractible and is formed from an elastic body such as rubber or the like, is disposed within the concave portion 30. More specifically, as illustrated in FIG. 2, the tube 36 is provided at a portion of the rim 14 corresponding to the outer side of the base tire 12 along the tire axial direction. A valve 38 for filling air in the tube 36 is attached to the tube 36 so as to project in the inner direction of the rim 14. The valve 38 is connected, via an unillustrated tube, to a compressor 40 serving as an internal pressure providing means. A portion of the tube 36 is fixed to the tube case portion 32 by an adhesive or the like so that the tube 36 does not come out from the concave portion 30.

When internal pressure is provided to the tube 36 in a state in which the base tire 12 has not been mounted to the rims 14, the tube 36 inflates toward the bead portion 16 and protrudes further inwardly than the outer contour line of the bead portion 16 along the outer surface of the bead portion 16 as illustrated by the two-dot/dash line. It is preferable that the size of the protrusion amount X in a direction perpendicular to the outer contour line when the tube 36 is inflated is about 25% of the entire width Y of the tube 36 when inflated.

As shown in FIG. 1, an envelope 46, which is annular and has a U-shaped cross-section and which is formed from rubber is made to cover the outer periphery of the base tire 12. A suction device 52 is connected to the envelope 46 via a tube 47. The suction device 52 serves as a suction means for sucking air and is, for example, a vacuum pump or the like. When the suction device 52 is operated, the air within a space S between the envelope 46 and the base tire 12 is sucked.

A method for recapping a tire using the apparatus 10 for manufacturing a recapped tire will be described hereinafter.

First, the base tire 12, for which predetermined buffing and the like have been completed, is mounted to the pair of rims 14. An unvulcanized sheet rubber 42 is adhered to a predetermined position of the crown portion which is the outer peripheral side portion (top side portion in FIG. 1) of the base tire 12. A vulcanized tread 44 is adhered on the sheet rubber 42 (see FIG. 1).

Figure 5A:
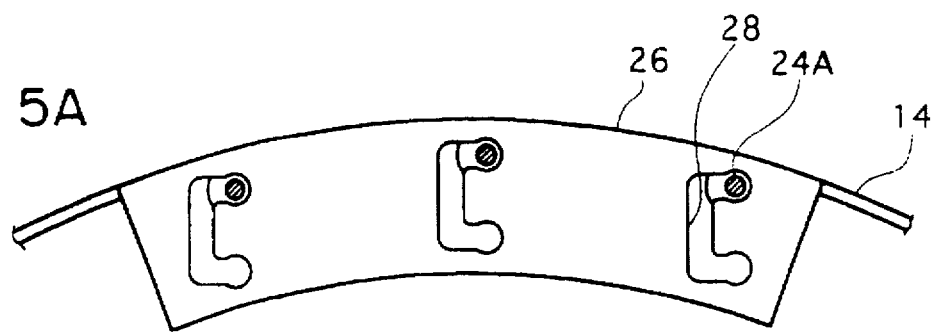

The annular envelope 46 is covered on from above the tread 44, and the end portions of the envelope 46 are disposed at predetermined positions of the outer sides of the pair of bead portions 16, respectively. When the base tire 12 is to be mounted to the pair of rims 14, in order to facilitate mounting of the base tire 12, the stopper plates 26 are set in advance near the radial direction inner sides of the rims 14 as illustrated in FIGS. 4A and 5A.

Figure 5B:
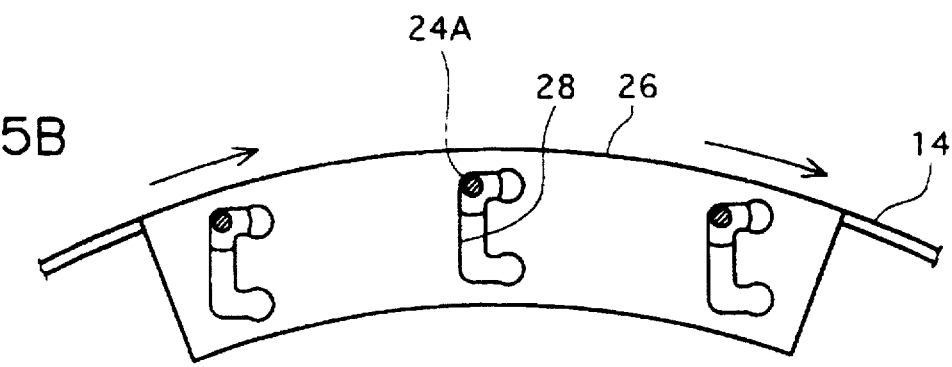
Figure 5C:
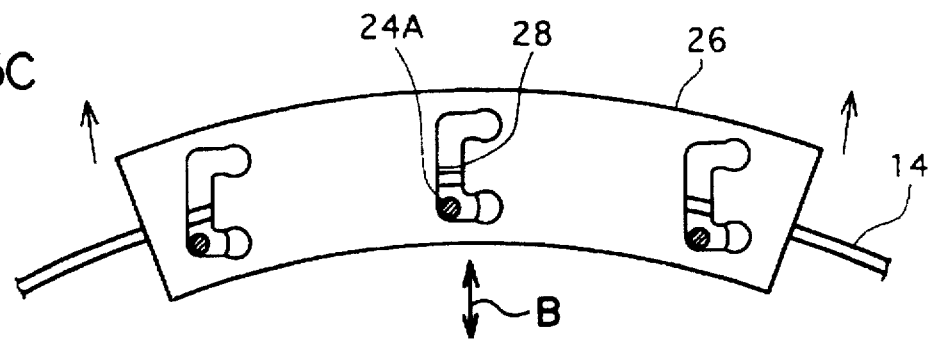
Figure 5D:
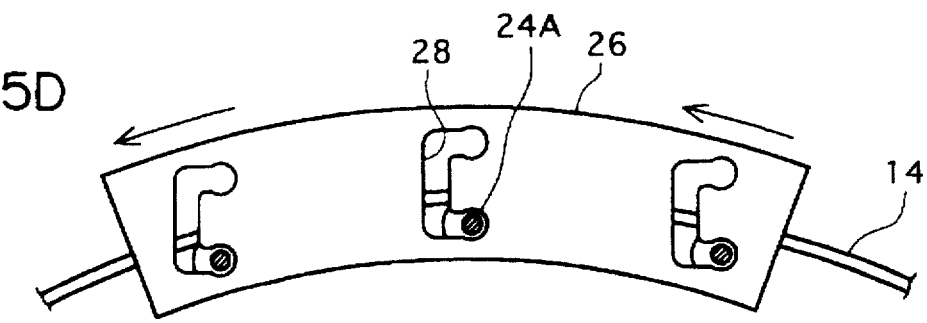
Figure 6:
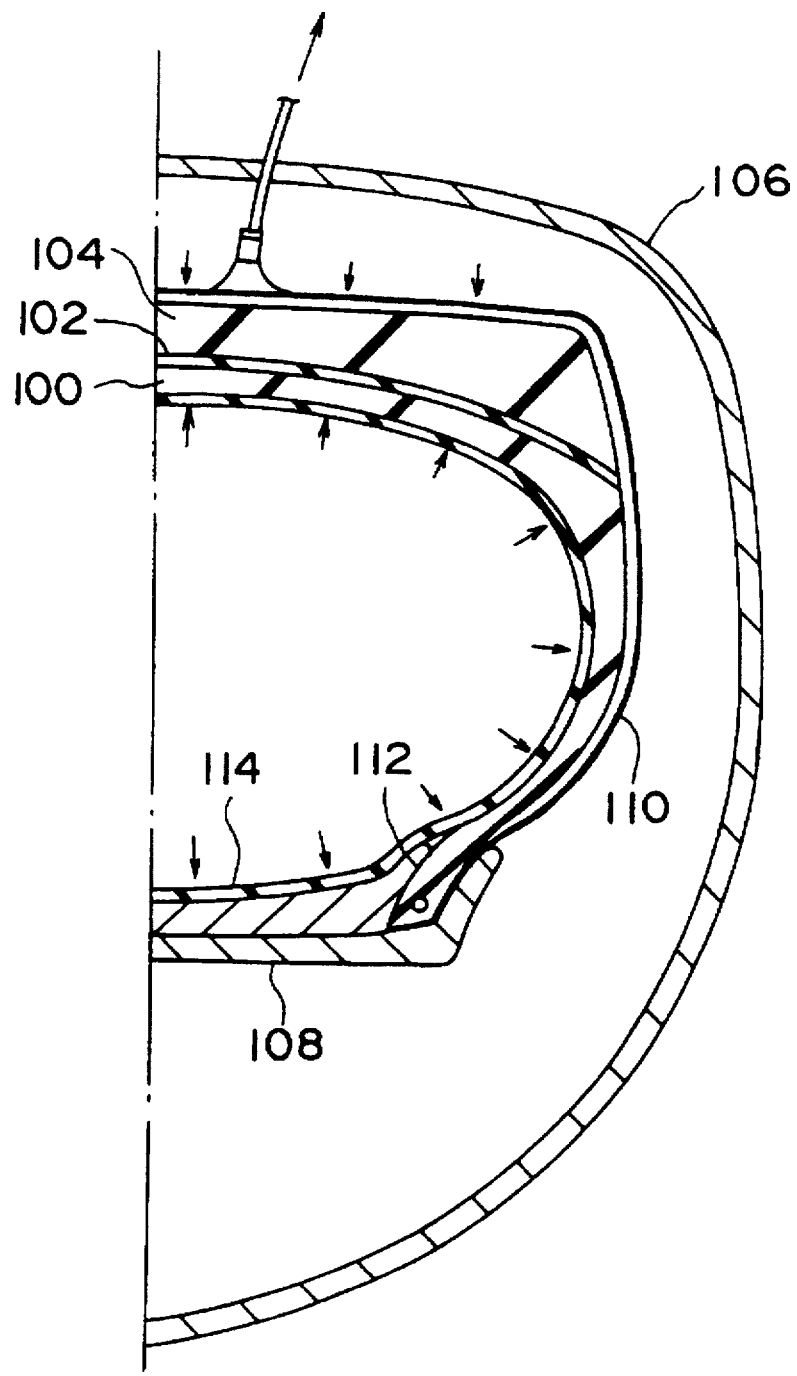
FIG. 6 is a sectional view of a conventional apparatus for manufacturing a recapped tire.
Figure 7:
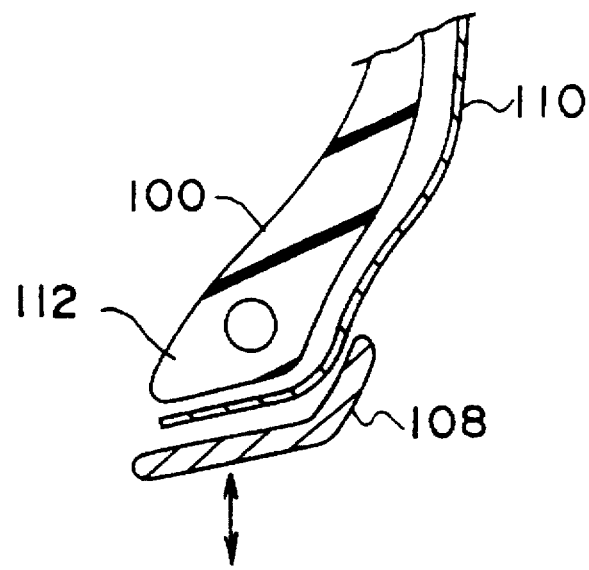
FIG. 7 is a sectional view of a rim portion of another conventional example.
Figure 8:
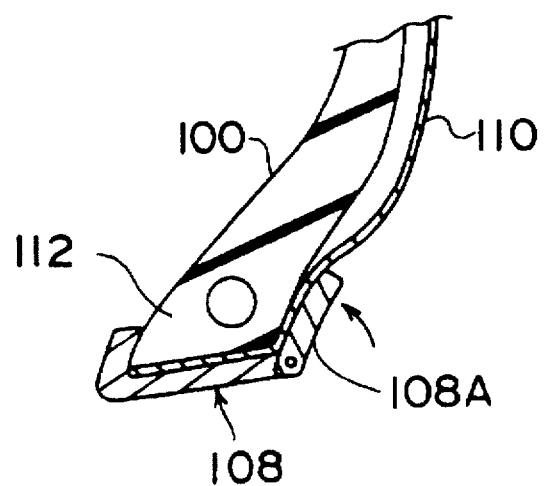
FIG. 8 is a sectional view of a rim portion of yet another conventional example.

After the base tire 12 has been mounted, the stopper plates 26 are slid in the peripheral direction of the rim 14 as illustrated in FIG. 5B. Thereafter, as illustrated in FIG. 5C, the stopper plates 26 are slid toward the radial direction outer side of the rim 14. Then, as illustrated in FIG. 5D, the stopper plates 26 are slid in the peripheral direction of the rim 14 so as to position the screw portions 24 at the end portions of the U-shaped holes 28.

Thereafter, air is filled in the tubes 36, and the tubes 36 are inflated. (The air is of a higher pressure than the steam or hot air filled in the interior portion of the vulcanizer 48, and is, for example, high pressure air of 7 to 8 kg/cm$^2$.) In this way, the end portions of the envelope 46 are nipped and fixed between, on the one hand, the inflated tubes 36, and on the other hand, the bead portions 16 for which movement toward the inner side of the base tire 12 along the tire axial direction is prevented by the stopper plates 26. The space between the base tire 12 and the envelope 46 is sealed. Further, the air in the space between the envelope 46 and the base tire 12 is sucked by the suction device 52, and the space between the envelope 46 and the base tire 12 becomes a vacuum.

At this time, because the bead portion 16 pushes the stopper plates 26 due to the filling of air in the tube 36, the stopper plates 26 do not move inadvertently.

After the end portions of the envelope 46 have been fixed, fluid for vulcanization (e.g., steam or hot air of a pressure of 6 kg/cm$^2$) is filled within the vulcanizer 48.

The space between the envelope 46 and the base tire 12 is made a vacuum, and the fluid for vulcanization is filled within the vulcanizer 48 so that the pressure within the vulcanizer 48 increases. Therefore, the envelope 46 is pressed toward the base tire 12 and fits tightly to the tread 44, and the tread 44 is pushed against the base tire 12.

Accordingly, due to the fluid for vulcanization, heating is carried out both from the inner side of the base tire 12 and from the envelope 46 side. Therefore, heat is transferred quickly to the sheet rubber 42, and the sheet rubber 42 is vulcanized in a short time. Due to the vulcanization of the sheet rubber 42, the tread 44 is adhered by vulcanization to the base tire 12 via the sheet rubber 42.

Because the tube 36 is formed from an elastic body and can expand and contract, even if the configuration of the bead portion 16 changes somewhat, the tube 36 conforms to the configuration of the outer surface of the bead portion 16 and can push the outer peripheral surface of the bead portion 16 uniformly along the peripheral direction so that the space between the end portion of the envelope 46 and the bead portion 16 is sealed reliably. As a result, the fluid for vulcanization does not penetrate between the base tire 12 and the envelope 46, and the pushing force of the tread 44 by the envelope 46 does not weaken. Unsatisfactory adhering of the tread 44 can be prevented.

In the above-described embodiment, explanation was given of only the one tube 36 illustrated in FIG. 2 among the pair of tubes 36. However, the other tube 36 is operated in the same way. Due to the pair of tubes 36, the spaces between the end portions of the envelope 46 and the pair of bead portions 16 are respectively sealed reliably.

As described above, the apparatus for manufacturing a recapped tire of the present invention has a superior effect in that, because the spaces between the end portions of the envelope and the bead portions of the base tire are sealed reliably, adhering of the tread by vulcanization can be carried out in a short time without shortcomings in manufacturing.

What is claimed is:

1. An apparatus for manufacturing a recapped tire, comprising:
   a vulcanizer in which is filled a fluid for vulcanization for adhering by vulcanization a base tire and a tread;
   a rim to which the base tire is mounted;
   an envelope which is annular and covers an outer periphery of the base tire;
   suction means for sucking air from between the base tire and said envelope;
   a tube which is annular and expandable and contractible, said tube being provided at a portion of said rim corresponding to an outer side of the base tire along a tire axial direction, and pushing said envelope against a bead portion of the base tire;
   a stopper provided at a portion of said rim corresponding to an inner side of the base tire along the tire axial direction, and preventing movement of the bead portion toward the inner side of the base tire along the tire axial direction; and
   internal pressure providing means for providing internal pressure to said tube so as to inflate said tube.

2. An apparatus for manufacturing a recapped tire according to claim 1, wherein the fluid for vulcanization filled in said vulcanizer is one of steam and hot air.

3. An apparatus for manufacturing a recapped tire according to claim 1, wherein said envelope is formed of elastically deformable rubber.

4. An apparatus for manufacturing a recapped tire according to claim 1, wherein said suction means is a vacuum pump.

5. An apparatus for manufacturing a recapped tire according to claim 1, wherein said tube is formed of elastically deformable rubber.

6. An apparatus for manufacturing a recapped tire according to claim 1, wherein a tube case is fixed to said rim by welding, and said tube is disposed within said tube case.

7. An apparatus for manufacturing a recapped tire according to claim 1, wherein said stopper is formed by a plurality of stopper plates, the stopper plates being slidably supported at said rim.

8. An apparatus for manufacturing a recapped tire according to claim 1, wherein said internal pressure providing means is a compressor.

9. An apparatus for manufacturing a recapped tire according to claim 1, wherein said internal pressure providing means makes an internal pressure of said tube a pressure which is higher than a pressure of the fluid for vulcanization filled in said vulcanizer.

10. An apparatus for manufacturing a recapped tire, comprising:

a vulcanizer in which is filled a fluid for vulcanization for adhering by vulcanization a base tire and a tread;

a rim to which the base tire is mounted;

an envelope which is annular and covers an outer periphery of the base tire;

suction means for sucking air from between the base tire and said envelope;

a tube which is annular and expandable and contractible, said tube being provided at a portion of said rim corresponding to an outer side of the base tire along a tire axial direction, and pushing said envelope against a bead portion of the base tire;

a main body block mounted to said rim;

a stopper provided at an inner side of the base tire along the tire axial direction and slidably supported at said main body block, said stopper being slidable to a state in which said stopper prevents movement of the bead portion toward the inner side of the base tire along the tire axial direction; and internal pressure providing means for providing internal pressure to said tube so as to inflate said tube.

11. An apparatus for manufacturing a recapped tire according to claim 10, wherein said main body block is fixed to said rim by welding, and supports said stopper such that said stopper is slidable in a radial direction of said rim.

12. An apparatus for manufacturing a recapped tire according to claim 10, wherein a through-hole is formed in said main body block, a U-shaped hole is formed in said stopper, a bolt is inserted into the through-hole of said main body block and the U-shaped hole of said stopper, and said main body block supports said stopper such that said stopper is slidable in a radial direction of said rim.

13. An apparatus for manufacturing a recapped tire according to claim 10, wherein said stopper is formed from a plurality of stopper plates, and the stopper plates are slidably supported at said rim via said main body block.

14. An apparatus for manufacturing a recapped tire according to claim 10, wherein a tube case in which said tube is disposed is fixed by welding to one end of said rim, and said main body block is fixed by welding to another end of said rim, and in a state in which said stopper has been slid to a radial direction outer side of said rim, said tube is inflated and an end portion of the envelope is sealed.

15. An apparatus for manufacturing a recapped tire, comprising:

a vulcanizer in which is filled a fluid for vulcanization for adhering by vulcanization a base tire and a tread;

a pair of rims to which the base tire is mounted;

an envelope which is annular and covers an outer periphery of the base tire;

suction means for sucking air from between the base tire and said envelope;

a pair of tubes which are respectively annular and expandable and contractible, said pair of tubes respectively being provided at portions of said pair of rims corresponding to an outer side of the base tire along a tire axial direction, said pair of tubes respectively pushing said envelope against a pair of bead portions of the base tire mounted to said pair of rims;

a pair of stoppers respectively provided at portions of said pair of rims corresponding to an inner side of the base tire along the tire axial direction, said pair of stoppers respectively preventing movement of the pair of bead portions toward the inner side of the base tire along the tire axial direction; and internal pressure providing means for providing internal pressure to said pair of tubes so as to inflate said pair of tubes.

16. An apparatus for manufacturing a recapped tire according to claim 15, wherein said pair of tubes are formed of elastically deformable rubber.

17. An apparatus for manufacturing a recapped tire according to claim 15, wherein tube cases are fixed by welding to said pair of rims respectively, and said pair of tubes is disposed within said tube cases.

18. An apparatus for manufacturing a recapped tire according to claim 15, wherein main body blocks are fixed by welding to said pair of rims respectively, and said pair of stoppers are slidably supported at said main body blocks respectively.

19. An apparatus for manufacturing a recapped tire according to claim 15, wherein said pair of stoppers are respectively formed from a plurality of stopper plates, the stopper plates being slidably supported at said pair of rims respectively.

20. An apparatus for manufacturing a recapped tire according to claim 15, wherein said internal pressure providing means is a compressor.

* * * * *